(12) United States Patent
Hazan

(10) Patent No.: US 12,709,010 B2
(45) Date of Patent: Aug. 18, 2026

(54) METHOD AND SYSTEM FOR ENABLING INSPECTING AN INDUSTRIAL ROBOTIC SIMULATION AT A CRUCIAL VIRTUAL TIME INTERVAL

(71) Applicant: Siemens Industry Software Ltd., Tel Aviv (IL)

(72) Inventor: Moshe Hazan, Elad (IL)

(73) Assignee: Siemens Industry Software Ltd., Tel Aviv (IL)

( * ) Notice: Subject to any disclaimer, the term of this patent is extended or adjusted under 35 U.S.C. 154(b) by 50 days.

(21) Appl. No.: 18/718,501

(22) PCT Filed: Dec. 14, 2021

(86) PCT No.: PCT/IB2021/061676

§ 371 (c)(1),
(2) Date: Jun. 11, 2024

(87) PCT Pub. No.: WO2023/111630

PCT Pub. Date: Jun. 22, 2023

(65) Prior Publication Data

US 2024/0399580 A1 Dec. 5, 2024

(51) Int. Cl.
*B25J 9/16* (2006.01)
*B25J 13/06* (2006.01)

(52) U.S. Cl.
CPC .......... *B25J 9/1671* (2013.01); *B25J 9/1676* (2013.01); *B25J 13/06* (2013.01)

(58) Field of Classification Search
CPC ........ B25J 9/1671; B25J 13/06; B25J 9/1676; G05B 2219/40317; G05B 2219/40099; G05B 2219/32351; G05B 19/042; G05B 17/02; G06F 30/20
See application file for complete search history.

(56) References Cited

U.S. PATENT DOCUMENTS

2003/0090491 A1* 5/2003 Watanabe .............. B25J 9/1671 345/473
2007/0135932 A1* 6/2007 Pannese ................. B25J 9/1671 700/17
2011/0153080 A1 6/2011 Shapiro et al.
2013/0116828 A1 5/2013 Krause et al.
(Continued)

*Primary Examiner* — Stephen Holwerda
(74) *Attorney, Agent, or Firm* — Laurence A. Greenberg; Werner H. Stemer; Ralph E. Locher

(57) ABSTRACT

A GUI screen of a robotic simulation platform is provided for viewing a 3D graphical representation of a simulated industrial scene with multiple robots performing robotic operations in their respective robotic spaces. A set of crucial robotic locations with its own robotic space is received for each robot. A set of corresponding crucial robotic time points collected during a simulation of the industrial scene is associated with each crucial robotic locations set. Each crucial robotic location set is represented via a 3D graphic object as a robotic slider positionable in the corresponding robotic space on the GUI screen. The robotic slider receives selection of a crucial robotic location of a specific robot and, upon reception of a selected crucial robotic location, the system enables jumping the 3D graphical representation of the simulated scene to the crucial robotic time point associated with the selected crucial robotic location.

15 Claims, 6 Drawing Sheets

(56) References Cited

U.S. PATENT DOCUMENTS

| | | | | |
|---|---|---|---|---|
| 2015/0277430 | A1* | 10/2015 | Linnell | G05B 19/42 700/257 |
| 2015/0336269 | A1 | 11/2015 | Linnell et al. | |
| 2019/0221037 | A1* | 7/2019 | Sugaya | B25J 9/163 |
| 2020/0070281 | A1* | 3/2020 | Takeda | B23K 26/0884 |
| 2020/0241513 | A1* | 7/2020 | Yoshikawa | G05B 19/41885 |

* cited by examiner

METHOD AND SYSTEM FOR ENABLING INSPECTING AN INDUSTRIAL ROBOTIC SIMULATION AT A CRUCIAL VIRTUAL TIME INTERVAL

TECHNICAL FIELD

The present disclosure is directed, in general, to computer-aided design, visualization, and manufacturing ("CAD") systems, product lifecycle management ("PLM") systems, product data management ("PDM") systems, production environment simulation, and similar systems, that manage data for products and other items (collectively, "Product Data Management" systems or PDM systems). More specifically, the disclosure is directed to production environment simulation.

BACKGROUND OF THE DISCLOSURE

Software applications for industrial robotic simulation are used for validation, optimization and virtual commissioning purposes.

Examples of such robotic simulation platforms and systems include, but are not limited to, Computer Assisted Robotic ("CAR") tools, Process Simulate (a product of the Siemens Group), robotic software simulations tools, software applications for industrial robotic simulation and other systems and virtual stations for industrial robotic simulation.

A robotic simulation platform enables simulation engineers to simulate multiple robotic operations performed by multiple industrial robots on a simulated scene of the shop floor.

Often, in a Graphical User Interface ("GUI") of a simulated industrial scene, there are dozens of virtual robots operating simultaneously and, therefore, the simulation inspection can often become a very challenging task for the simulation engineers.

Typically, the simulation engineers, in order to inspect the three-dimensional ("3D") kinematics behaviors of multiple robots in their virtual simulation environment, make use of a simulation slider provided on the Graphical User Interface ('GUI') screen of the robotic simulation platform. The simulation slider enables the users to scroll the 3D graphics of the simulated scene along the virtual simulation time by means of a slider's cursor.

FIG. 3 schematically illustrates an example of a typical simulation slider of a GUI of a robotic simulation platform. In order to inspect the industrial simulation, simulation engineers typically move a cursor 301 positioned on the slide SO to scroll the 3D graphics of the scene. The cursor 301 reflects the virtual time of the whole simulation and the users move this cursor 301 in order to inspect the robotic kinematic behaviors by viewing the moving 3D graphics of the simulated scene.

For industrial plants where several industrial robots are performing various robotic operations, the simulation inspection functionalities provided by such a simulation slider S0 are unsatisfactory.

In fact, when users desire to inspect a simulated crucial behavior of one specific robot performing its own crucial robotic operations in its own robotic space, they are required to manually scroll the simulation slider cursor 301 while viewing the moving 3D graphics of the simulation GUI in order to find out when the desired crucial robotic times of these crucial robotic operations of the chosen specific robot are reached.

Current techniques for enabling inspecting an industrial robotic simulation at a crucial virtual time interval are cumbersome, tedious, error prone, and otherwise ill-suited for the task. Improved techniques are desirable.

SUMMARY OF THE DISCLOSURE

Various disclosed embodiments include methods, systems, and computer readable mediums for enabling inspecting an industrial simulation at a crucial virtual time interval around a crucial robotic time point. A GUI screen of a robotic simulation platform is provided for viewing a 3D graphical representation of a simulated industrial scene comprising multiple robots performing robotic operations in own respective robotic spaces. A method includes receiving for each robot of a plurality of robots, a set of crucial robotic locations comprised in its own robotic space. The method further includes associating to each crucial robotic locations set, a set of corresponding crucial robotic time points collected during a simulation of the industrial scene executed by the robotic simulation platform. The method further includes representing each crucial robotic location set via a 3D graphic object positionable in the corresponding robotic space on the GUI screen, said object hereinafter being called robotic slider; said robotic slider being configured to receive a user selection of a crucial robotic location. The method further includes enabling receiving a selection of a crucial robotic location of a specific robot via an interaction with a corresponding robotic slider. The method further includes, upon reception of a selected crucial robotic location, enabling jumping the 3D graphical representation of the simulated scene to the crucial robotic time point associated to the received selected crucial robotic location.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
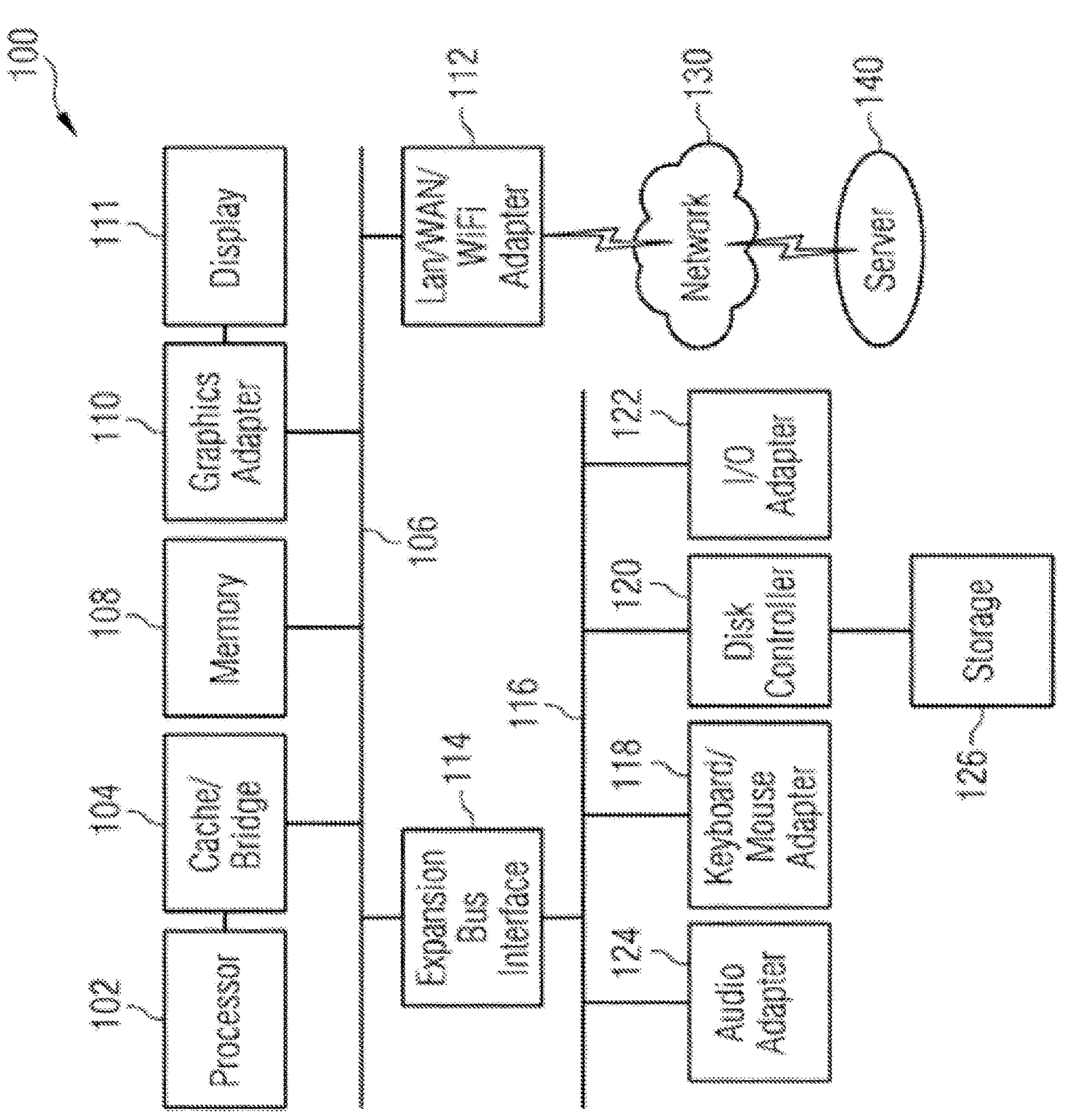
FIG. 1 illustrates a block diagram of a data processing system in which an embodiment can be implemented.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Features, advantages, or alternative embodiments herein can be assigned to the other claimed objects and vice versa.

Previous techniques did not enable to efficiently inspect an industrial simulation at a crucial virtual time interval. The embodiments disclosed herein provide numerous technical benefits, including but not limited to the following examples.

Embodiments enable providing a GUI of a robotic simulation platform with a plurality of robot-specific sliders.

In embodiments, a robotic slider of a specific robot may comprise—or be constituted of—a set of target robotic locations for the specific robot.

In embodiments, a robotic slider may comprise—or be constituted of—a curvilineal graphic object denoting a robot's tool path.

In embodiments, a robotic slider may comprise—or be constituted of—a set of robot's collision points.

In embodiments, a robotic slider may comprise—or be constituted of—robot's swept volumes.

In embodiments, the shape of one or more robot sliders may be dynamically built depending on the outcome of the simulated industrial scene.

In embodiments, the robotic sliders assist users visualizing the robotic operations performed by the robot's tool in the 3D space and during crucial robotic time intervals.

In embodiments, one or more points of the slider are configured to receive one or more user selections.

In embodiments, upon picking on any point of the graphically depictable simulation slider, the whole simulation is accordingly scrolled to the right point of time.

In embodiments, the robotic sliders assist the simulation engineers in selecting a crucial robotic location for jumping the full simulation at the corresponding virtual simulation crucial time point in order to reproduce and inspect a certain robotic behavior of a specific robot at a crucial robotic time interval around the virtual simulation crucial time point.

In embodiments, a robotic slider may have a moving and movable cursor assisting users in inspecting robots' activities at specific crucial robotic times.

In embodiments, a cursor moving along on one or more robotic sliders and/or along on the simulation slider enable connecting tasks of each one or more corresponding robots along the virtual time of the simulation.

In embodiments, one or more robotic sliders efficiently improve the inspection functionalities of industrial simulation tools for simulation engineers.

Embodiments enable inspecting, controlling and/or improving an industrial simulation of a dynamic multi-robot and of a multi-cell scene.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but are not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
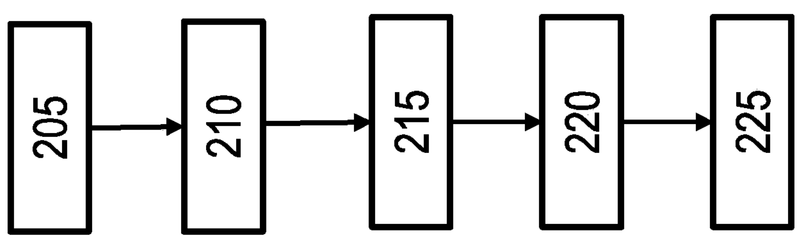
FIG. 2 illustrates a flowchart for enabling inspecting an industrial simulation at a crucial virtual time interval in accordance with disclosed embodiments.
Figure 3:
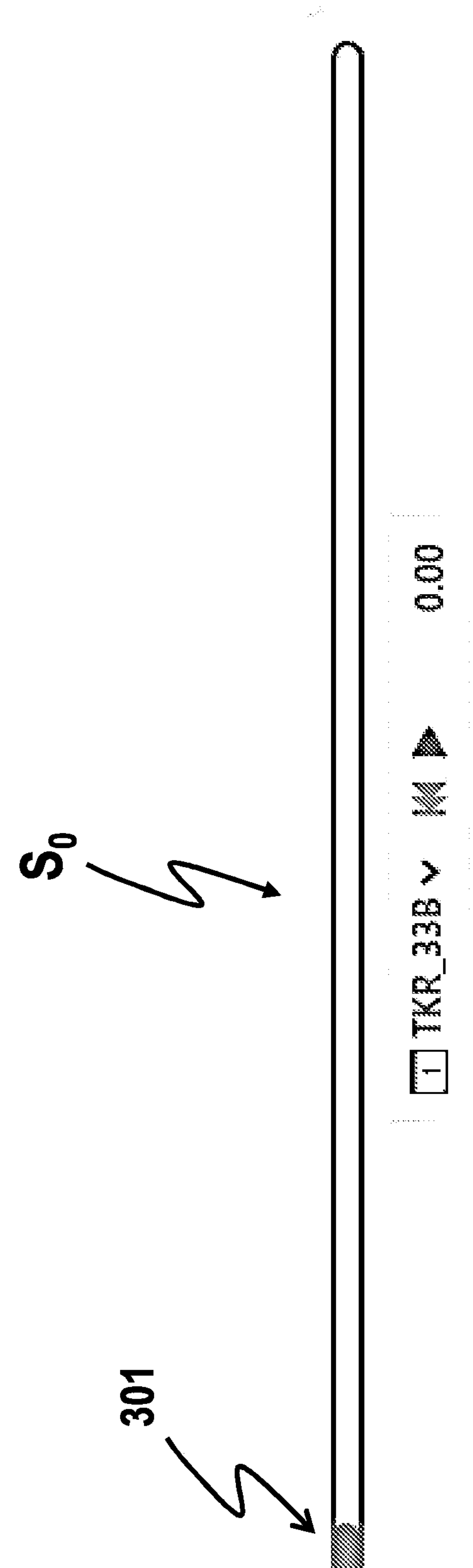
FIG. 3 schematically illustrates an example of a typical simulation slider of a GUI of a robotic simulation platform.

FIG. 2 illustrates a flowchart of a method for enabling inspecting an industrial simulation at a crucial virtual time interval in accordance with disclosed embodiments. Such method can be performed, for example, by system 100 of FIG. 1 described above, but the "system" in the process below can be any apparatus configured to perform a process as described.

A GUI screen of a robotic simulation platform is provided for viewing a 3D graphical representation of a simulated industrial scene comprising multiple robots performing robotic operations in own respective robotic spaces.

As used herein the term "robotic space" generally denotes a combination of one or more portions of virtual space where the robot and the robot's tool operate and it may preferably be located around the robot's target locations and the robot's tool path. In embodiments, the robotic space may include a combination of spaces, points lines, 3D frames and any robot's swept volumes.

At act 205, for each robot of a plurality of robots, a set of crucial robotic locations in its own robotic space are received.

As used herein the term crucial robotic location denotes any robotic location, in a robotic space of a specific robot, which may be considered interesting or important for a simulation engineer inspecting it.

In embodiments, the set of crucial robotic locations comprise a robot's tool path, a set of robot's target locations, a set of collisions points and/or robot's swept volumes.

Examples of crucial robotic locations may include, but are not limited to, robotic target locations, robotic tools paths e.g. Tool Center Points ("TCP"), Tool Center Point Frames ("TCPF"), robot tool's trajectories, robot's collisions points, robot's swept volumes or any other key robotic location. Examples of robot's swept volumes include but are not limited to volumes swept exclusively by the robots, volumes swept by the robots with their own tools and equipment pieces and/or the volumes swept by the robots with their tools and their gripped parts etc.

At act 210, to each crucial robotic locations set, it is associated a corresponding set of crucial robotic time points collected during a simulation of the industrial scene executed by the robotic simulation platform. In embodiments, the crucial robotic time points are extracted from the virtual time points of the executed simulation.

At act 215, each crucial robotic location set is represented via a 3D graphic object positionable in the corresponding robotic space on the GUI screen, this graphic object being called robotic slider. The robotic slider is configured to receive a user selection of a crucial robotic location, e.g. via a click action of a user on a point of the slider, the clicked point corresponding to a crucial robotic location.

As used herein the term robotic slider denotes a graphic object specific for a given robot comprising the robot's crucial locations in accordance with embodiments. In embodiments, said robotic slider is conveniently configured to receive user's selections of one or more of its points for simulation inspection purposes.

At act 220, the system enables receiving a selection of a specific crucial robotic location of a specific robot via an interaction with a corresponding robotic slider.

At act 225, the system, upon receiving a desired selected crucial robotic location, enables jumping the 3D graphical representation of the simulated scene to the crucial robotic time point associated to the desired location for simulation inspection purposes. Advantageously, simulation engineers are enabled to inspect the robotic simulation at a crucial virtual simulation time interval around the crucial robotic time point.

Of course, those of skill in the art will recognize that, unless specifically indicated or required by the sequence of operations, certain steps in the processes described above may be omitted, performed concurrently or sequentially, or performed in a different order.

Embodiments further include enabling simulation engineers to perform one or more of the following steps:

- inspecting the simulated scene at one or more crucial virtual time intervals around one or more crucial robotic time points;
- modifying a set of robotic parameters based on the outcome of the performed inspection;
- re-executing the simulation with the modified robotic parameters;
- inspecting the modified industrial simulated scene at one or more crucial virtual time intervals around one or more crucial robotic times;
- enabling performing manufacturing operations based on the operations as simulated in the modified industrial simulated scene.

In embodiments, the simulated scene may preferably be inspected for virtual commissioning purposes.

In embodiments, the set of modifiable robotic parameters include robotic location position, robotic motion or other process parameters of the robotic facility.

In embodiments, after a simulation run execution, a selection of automatically detected critical robotic time points may advantageously be provided for simulation inspection purposes as a selection of corresponding critical robotic locations marked on one or more corresponding robotic sliders.

In embodiments, one or more robotic sliders may conveniently comprise a moving and movable cursor for enabling simultaneously representing and interacting with a current virtual simulation time point on said sliders for simulation inspection purposes. Examples of robotic sliders with synchronized cursors are shown on the robotic sliders of the exemplary embodiment of FIG. 6.

In embodiments, a plurality of robots may be a subset of the multiple robots of the simulated facility scene. Assume, for example, that the full simulation includes 100 robots across various robotic cells, it may conveniently be that only for twenty specific robots, their corresponding twenty robotic sliders are generated and positioned on their corresponding robotic spaces of the GUI screen.

Embodiments for enabling inspecting an industrial simulation of a multi-robot facility at a virtual time interval include the following two main phases:

- generating a robotic slider for each robot of a plurality of robots during a simulation run, where the plurality of robots is a subset of the set of multiple robots of the industrial facility; and,
- inspecting the industrial simulation at crucial virtual time intervals by an interaction with one of the generated robotic sliders positioned on the GUI of the simulation platform.

In exemplary embodiments, a plurality of robot sliders are generated for a plurality of N robots $R_1$, Ri, $R_N$ including but not limited to the following exemplary algorithm steps and sub-steps:

- step 1) execute the full simulation via a robotic simulation platform;
- step 2) for each robot Ri,
  - a) for each time interval,
    - i) draw a line along the path delineated by the robotic tool center point ("TCP")
    - ii) on the line, save a set of simulation time points associated to the line points;
    - iii) in case robot Ri doesn't move, do nothing.

At the end of step 2, for each robot Ri, a unique robotic slider Si is generated. Advantageously, the generated robotic sliders are 3D trajectory lines reflecting the robot activities performed by the corresponding robots in each own robotic space.

Figure 4:
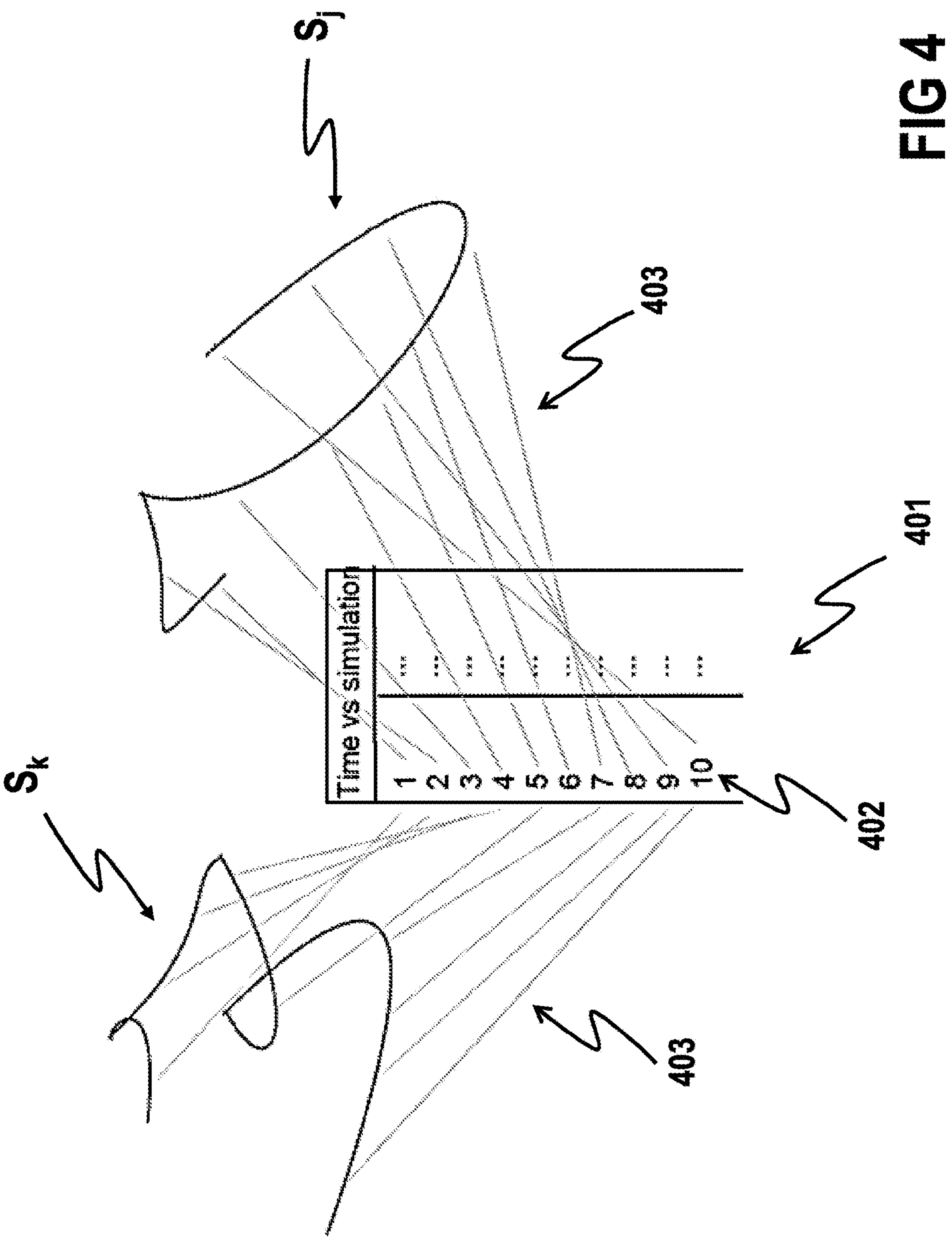
FIG. 4 schematically illustrates a generation of two robotic sliders in accordance with embodiments.

FIG. 4 schematically illustrates a generation of two robotic sliders in accordance with embodiments.

In FIG. 4, two robotic sliders Sk, Sj of two corresponding robots Rk, Rj (not shown) are generated in a simulation run by associating crucial robotic locations to corresponding crucial robotic times which correspond to the (crucial) virtual simulation times. Each crucial robotic location of a slider is associated to a corresponding crucial robotic time point. In embodiments, the association crucial robotic locations and simulation virtual time points may be stored on each part of the robotic slider itself. In embodiments, the association crucial robotic locations and simulation virtual time points may be stored in a table 401 herein called robotic crucial time table. The robotic crucial time table 401 stores the crucial robotic time points—which correspond to virtual simulation time points—and the associated crucial robotic locations. In embodiments, as shown in table 401, for one virtual simulation time points 402, there may be associated one or more crucial robotic locations 403 of one or more corresponding robotic sliders Sk, Sj.

In the above described exemplary algorithm steps for N robots Ri and in the exemplary embodiment shown in FIG. 4, the robotic sliders Si, Sk, Sj are generated as the trajectory line of the TCP of a corresponding robot's tool.

Figure 5:
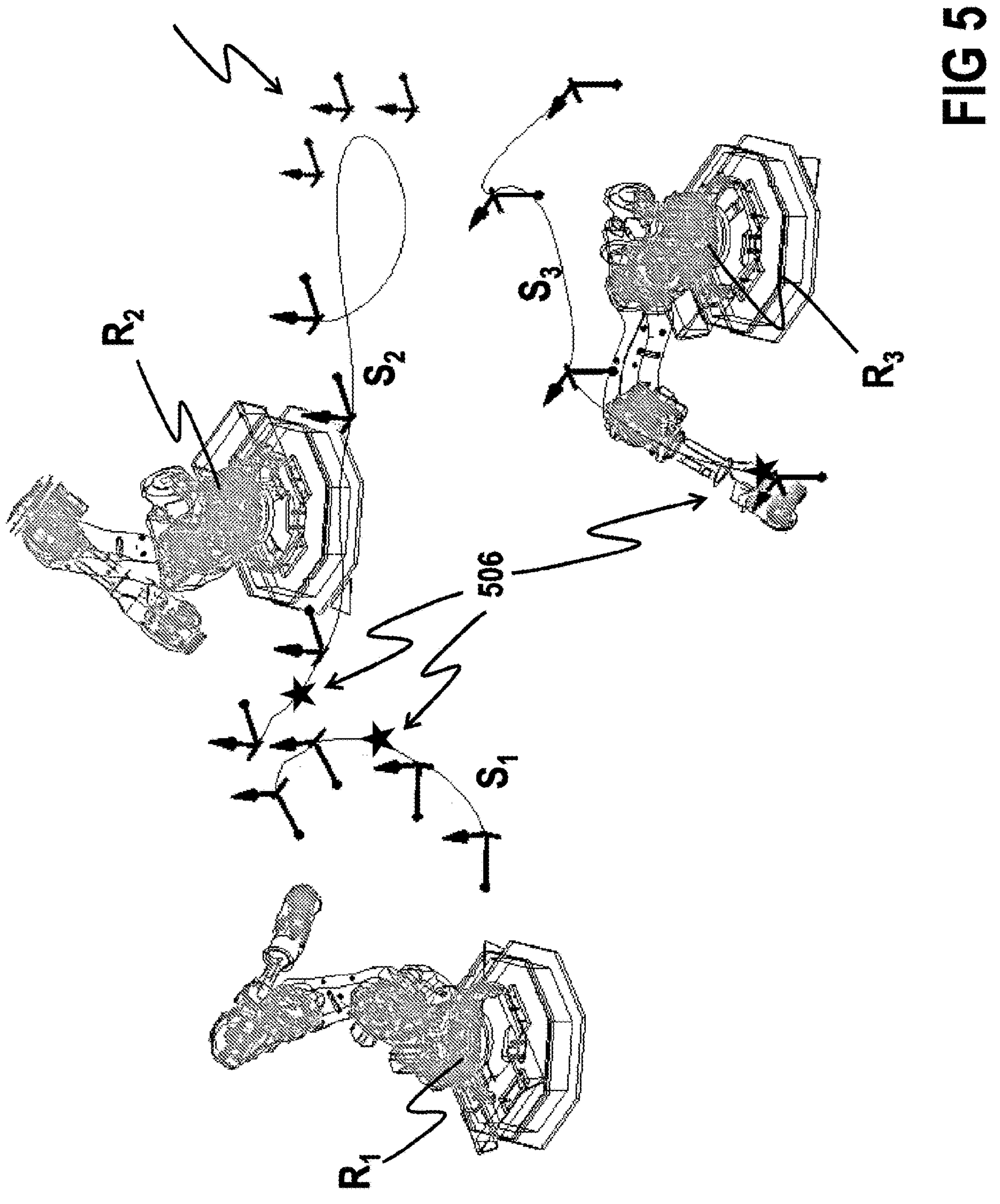
FIG. 5 schematically illustrates a GUI screen of an exemplary simulated scene in accordance with embodiments.

In other embodiments, as shown for example shown in FIG. 5, the robotic sliders $S_1$, $S_2$, $S_3$ may include not only the robot's TCP trajectory line but they may include also a set of robotic target locations 505 of their own corresponding robot.

In other embodiments, not shown in any drawing, a robotic slider may be a graphic object comprising a set of robotic target locations only, without any graphic line depicting the robot's TCP trajectory path.

In embodiments, the usage of the plurality of generated robot sliders include but are not limited to the following exemplary algorithm steps.

In embodiments, after completion of the above algorithm step 2), a user is advantageously enabled to inspect the simulated robotic facility by zooming into the full robotic facility and diving into the relevant robotic space around robotic Ri as follows:

- a user can simply pick on desired portion of one given robotic slider Si;
- the system reads the virtual time which was kept for this picked slider portion;
- the system jumps—forward or backward—the 3D graphics of the recorded simulation to the relevant virtual time;
- the user can inspect the simulation by playing—forward and/or backward—the simulation 3D graphics from that reached virtual time.

FIG. 5 schematically illustrates a GUI screen of an exemplary simulated scene in accordance with embodiments.

Assume that in this illustrated exemplary simulated scene, the three robots $R_1$, R, $R_3$ are performing own robotic operations along their tool paths on their own robotic spaces (not shown). It is noted that, for explanatory purposes, the path of the tool center points of the three robots are illustrated whilst the corresponding robots' tools are not shown.

The robotic sliders $S_1$, $S_2$, $S_3$ are each represented as a graphic object comprising a set of robotic target locations and a robotic tool point trajectory. As shown in FIG. 5, some target locations 505 may be outside the robot's tool path, for example in case those target locations are not "fine zone" locations but rather flyby target location with a zone>0.

In embodiments, in order to inspect a simulated robotic scene, a user selects in the GUI one slider, e.g. the first slider $S_1$, then selects one desired point of the slider, for example the point marked with the star. Upon clicking to the selected point or by clicking to a corresponding GUI's command (not shown) e.g. called "jump simulation to selected location", the 3D graphics of the whole simulation jumps directly to the corresponding associated virtual simulation time point. In embodiments, one or more of the remaining robotic sliders $S_2$, $S_3$ are updated by updating the location of the corresponding cursors in their sliders which are also marked also via corresponding stars.

Hence, advantageously, by moving one of the cursors marked with stars 506, the user can move along the robotic crucial times the 3D graphics of the simulated virtual scene and inspect corresponding robotic operations performed by each of the three robots $R_1$, $R_2$, $R_3$.

By clicking on one or more points of the robotic sliders $S_1$, $S_2$, $S_3$, the simulation can jump to the corresponding one or more time point of the simulation.

Embodiments for enabling inspecting an industrial simulation of a multi-robot facility at a virtual time interval around a virtual time point include:

- creating on or more dynamic slider(s) per one or more robots during a simulation run by associating crucial robotic locations to corresponding crucial robotic time points which correspond to virtual time points of the simulation;
- providing robotic sliders whose line shape corresponds to the path of the robot's tool center point and/or comprise the location points of the robotic target locations;
- by picking a selected point of one robotic slider, the full simulation jumps to the relevant virtual time point and the 3D graphics is then updated accordingly.

In embodiments, not shown on any of the drawings, one or more robotic sliders may conveniently comprise only a set of target locations of the corresponding robot without its trajectory path. Advantageously, according to such embodiments, such robotic sliders—constituted by robotic locations only—do not require an additional graphic object on the virtual scene so that other virtual industrial objects are conveniently not covered.

In embodiments, a user may select a desired robotic location of a specific robot and, advantageously, with one click or by selecting a corresponding command or button, e.g. called "Jump simulation to location", the specific robot reaches with its tool this selected target location or a point close to it by having the full simulation jumping to the associated virtual time point. This is achieved in a fast and accurate manner.

Additionally, the 3D graphics of the entire simulation which may include several remaining robots, several parts, several conveyors and/or several other industrial objects and signals is updated to reflect the simulated scene at the corresponding crucial robotic time point.

Advantageously, with the simulation 3D graphic scene is updated in a fast manner given that it may be obtained in one click silently without the need of calculating and refreshing the 3D graphics along the way.

In embodiments, the user may select which and how many target robotic locations a robotic slider shall contain by selecting from a pool of available target locations within a GUI's operation tree editor (not shown), each target locations which is to be graphically represented in the corresponding robotic slider.

In embodiments, for robotic sliders comprising robotic target locations, the generation/preparation of such robotic sliders include but are not limited to the following exemplary algorithm steps. Each time a simulation run is executed, each time a robot reaches a target location, creating/updating a unique virtual simulation time parameter corresponding to the (crucial) virtual simulation time point. This unique virtual simulation parameter represents the robotic crucial time point associated to the corresponding robotic target location and is herein called "crucial virtual time" or "time-point" parameter. In other words, the time-point parameters holds the current simulation time-point on that robotic location. In embodiments, the association target locations and time-point may be stored in a table called "time-point vs. target locations" table.

In embodiments, via the GUI's of a simulated scene, the usage of the plurality of generated robotic sliders—constituted by target locations only—include but are not limited to the following exemplary algorithm steps:

- by a user, selecting, for a specific robot, a certain desired crucial robotic location directly in a GUI's robotic slider or indirectly via a GUI's operation tree editor;
- by a user, clicking on a certain command or button for jumping the full simulation to the corresponding crucial robotic time; in other embodiments, upon a turning on a user "robotic slider-jump" mode, a user can simply click on one or more crucial locations of the robotic slider until this "robotic slider-jump" mode is then turned off;
- by the system, extracting the time-point parameter associated to the selected crucial robotic location;
- by the system, checking the time-point value versus the current simulation time: if the current simulation time is null (simulation has not started yet), starting and play the simulation silently until the time-point value; else if the current simulation time<time-point value, moving the current simulation forward silently; else if the current simulation time>time-point value, moving the current simulation backwards silently. Advantageously, by playing or moving the simulation silently without the 3D graphics, a large time interval can be reached very fast, via a jump, without the need of calculating or updating the 3D graphics along the way. Upon reaching the time-point value, the system refreshes the 3D graphics of the reached simulation time.

At the reached crucial virtual time point, the specific robot has accurately reached the selected crucial robotic location or a position close to it and the whole simulation scene is aligned. Conveniently, the user can the play the simulation with graphics forward\backward as needed to inspect the behavior of one or more robots at a crucial virtual time interval around the reached crucial simulation time point.

It is noted that the information of the virtual simulation time or time-point parameter containing the current time of the entire simulation related to a specific crucial robotic location or tool trajectory point is kept for inspection purposes only and, therefore, at the time of downloading this time-point information may preferably be ignored. In embodiments, when saving the study, the crucial time-point information is conveniently saved and kept for usage for the next time the user loads the study for inspection purposes. In case, during the simulation inspection, the user changes some meaningful simulation parameters, at the subsequent simulation execution, the new corresponding crucial time point values will be overwritten and saved.

In an exemplary embodiment, assume there are two robots Rα, Rβ for which corresponding robotic sliders containing target location only are generated and used. Assume slider Sα is constituted by thirty six target locations $A_1$-$A_{36}$ of the robot Rα and assume that slider Sb is constituted by ninety target locations $B_1$-$B_{90}$ of robot Rβ. While inspecting the simulated scene, a user can advantageously click on any of the crucial robotic locations Ai, Bj of a corresponding specific robot Rα, Rβ, for example on location $A_{21}$ in the robotic space of robot Rα. Accordingly the 3D graphics of the simulation reaches the crucial virtual time point to have robot Rα stop at the desired location $A_{21}$, and have robot Rβ stop at its corresponding virtual simulation time in its corresponding location, for example a location between $B_{12}$ to $B_{13}$. In embodiments, the simulation 3D graphics reaches the crucial virtual time point with a jump, with or without refresh. Therefore, by selecting a single crucial robotic location and by one click on the slider or on a command, both robots Rα, Rβ are moved each one to its relevant place in the full simulation. It is noted that with the terms "simulation jumping" is herein intended playing silently the full simulation—without changing the graphics in order to save performances—until the desired selected crucial time is reached.

In embodiments, simulation engineers may execute one or more simulation runs offline, for example overnight, in order to obtain validations to test the simulation behavior of several cycles of several robotic tasks of several robots on the simulated shopfloor. In embodiments, a robotic slider may represent the last cycle of the several cycles performed by a specific robot. In fact, if a given robot reaches a specific location several times, e.g. it reaches location Lx several times, by doing over-writings, the slider's points may be associated to the last kept virtual simulation time point.

In other embodiments, a robotic slider's point may be associated to more than one virtual simulation time points. This is particularly convenient for critical robotic locations that may automatically be detected and marked as critical during one executed simulation run. For example, in embodiments, during such executed simulation run, the system can automatically detect one or more simulation critical times which are associated to one or more simulation problems detected in the simulated production lines. Examples of automatically detected simulation problems include, but are not limited to, risky situations between robots and/or equipment pieces, deadlocks, robot(s) waiting too long, too long cycle time(s), collision(s), problematic energy consumption, too high joint accelerations, any abnormal situation to be avoid by real robots of a real factory. The system can conveniently save one or more critical times without overwriting the in the subsequent robotic cycles. In embodiments, the critical locations may be marked with a flag, for example with red color, and, additionally, a note describing the specific encountered problem may be attached to it.

Advantageously, for each executed simulation runs and for each critical marked critical robotic location, the user can inspect the simulation by reviewing each critical locations one after one, for each time, pick on one, by having the simulation jumping to the critical virtual simulation time point, the user can read the note on the type of detected problem, inspect and review thoroughly the scene and can fix it according to an own decision or by a choosing a fixing decision automatically proposed by the system. For example, in embodiments, the system may automatically learn, via pattern recognition, via machine learning algorithms or via any other decision support system, what went wrong in the critical robotic loop versus the other non-critical robotic loops and hence may propose to the user a pool of possible fixing decisions to choose from.

Figure 6:
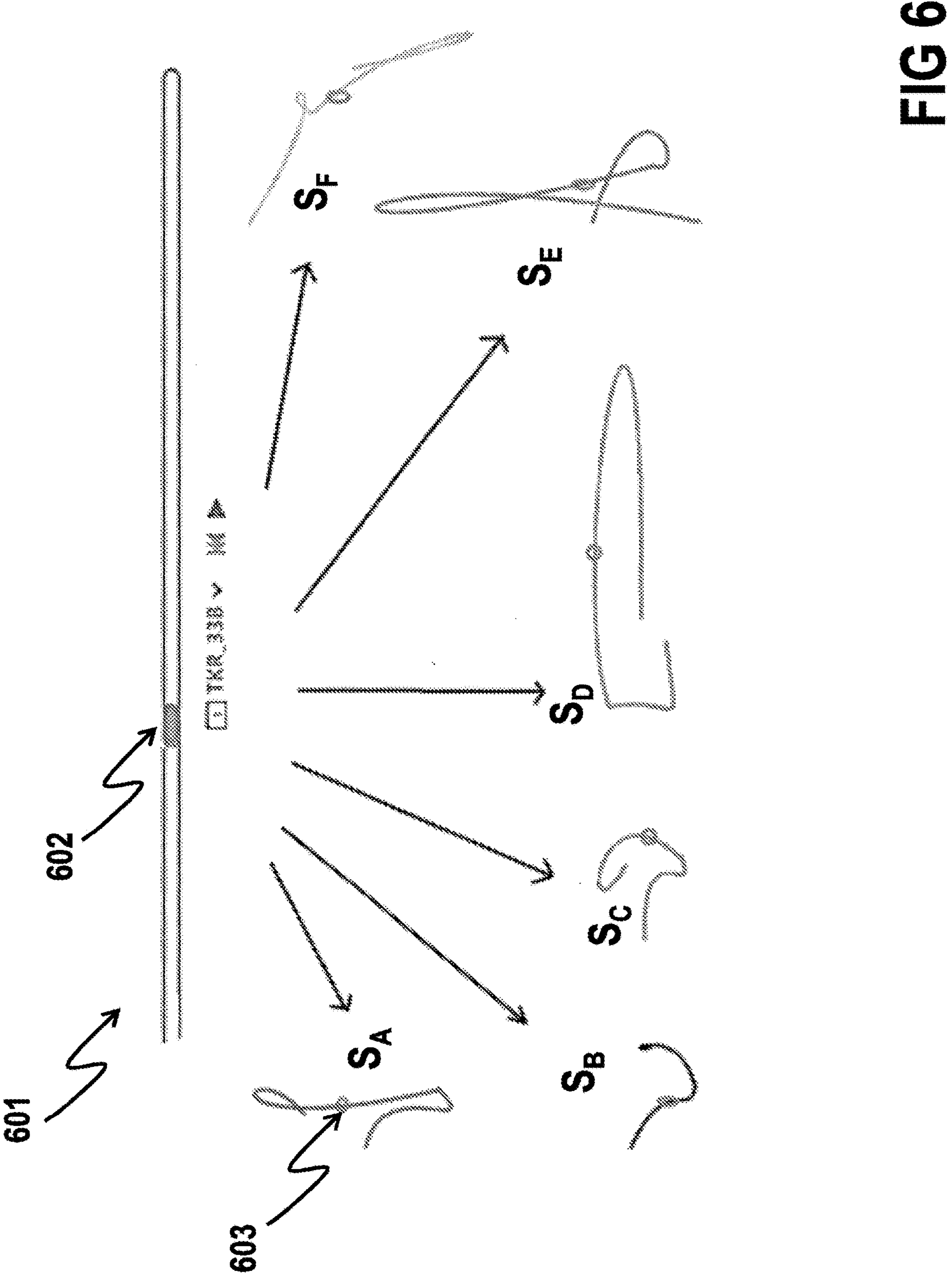
FIG. 6 schematically illustrates relationships among various sliders in accordance with embodiments.

FIG. 6 schematically illustrates relationships among various sliders in accordance with embodiments.

In FIG. 6, there are illustrated six robotic sliders $S_A$-$S_F$ of corresponding six robots $R_A$-$R_F$ (not shown). Additionally, the traditional simulation slider 601 of the full simulation is shown. Assume that a simulation engineer is interested in inspecting the behavior of robot $R_A$ in its robotic space. Then, the user selects—on the first slider $S_A$—a desired crucial robotic location by picking a point, e.g. via a movable cursor 603, and upon one click the full simulation jumps to the corresponding associated crucial virtual time. In embodiments, as shown in FIG. 6, all the cursors of the remaining five robotic sliders $S_B$-$S_F$ of the five remaining robots $R_B$-$R_F$ are automatically and synchronously moved by the system to the crucial robotic locations associated to the crucial virtual time as shown by the corresponding five cursors marked with five circles. Hence, the simulation engineers with one click are enabled to simultaneously and efficiently inspect the behavior of the six robots' tools in their six robotic spaces. Conveniently, also the time cursor 602 of the traditional simulation slider 601 is synchronously moved and updated by the system. In FIG. 6 it is shown the synchronization of the cursors of the six robotic sliders and of the cursor 602 of the traditional simulation slider. In embodiments, the simulation engineers, during inspection of the simulation, can conveniently decide whether to analyze the virtual time interval around a crucial robotic location by moving a robotic slider cursor or by moving the cursor on the traditional simulation slider 602.

Embodiments enable updating one or more positions of one or more cursors of one or more robotic sliders.

Embodiments enable getting one or more further selections of any of the cursors of any of the robotic sliders and by enabling to iterative perform the jumping, updating and inspecting steps.

It is noted that, with embodiments, the cursor of the robotic slider has a stronger value and meaning for the simulation engineer, in fact it reflects the virtual time of the simulation plus the "robot's activity" i.e. what the robot really does at that virtual time.

It is noted that in embodiments, while inspecting one crucial robotic time point, the cursor for one slider may be on one point of the tool path and the cursor for another robotic slider may not be shown at all, for example, because that other robot is not operating at that particular corresponding virtual simulation time.

In embodiments, for one simulation, there are a plurality of individual robotic sliders reflecting the robotic behaviors of a plurality of robots.

In embodiments, the shapes of the robotic sliders are various and are determined at simulation run time to reflect the true and full simulation behavior. Therefore, each robotic slider shape is dynamically built from a simulation execution run and it does not have a predetermined constant straight lines shape like in the case of prior traditional simulation sliders. In embodiments, the shape of the robotic sliders is three dimensional, e.g. a trajectory line or a collection of robotic target locations in the 3D space.

In embodiments, each robotic slider reflects a behavior of a single robot. Each robotic sliders may conveniently have a unique individual shape depending on the type of robot and robotic tool, on the robotic tasks and on the robotic behavior recorded in a specific full simulation.

In embodiments, each robotic slider of a plurality of robotic sliders of a plurality of robots is connected to a single whole recorded simulation and is therefore connectable to each single robot of the plurality of robots operating in the simulated scene.

In embodiments, the robotic sliders and the associated virtual simulation time are the result of a full robotic simulation execution which include, but is not limited by, the 3D robotic tasks of the plant robots, the signal evaluations, the PLCs, the LB, the sensors and many other industrial components and objects of the simulated scene.

In embodiments, by one click on the slider, the simulation engineer obtains a jump of the whole simulation scene into the relevant virtual time where the whole virtual scene is updated to reflect the full reality s of all the industrial objects including the activities of all robots, all conveyors, parts, signals etc.

Although exemplary embodiments of crucial robotic locations comprising trajectory tool paths and/or robotic target locations have been described in detail, those skilled in the art will are able to implement embodiments where the crucial robotic locations may comprise a set of collisions points and/or robot's swept volumes.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for enabling an inspection of an industrial simulation at a crucial virtual time interval around a crucial robotic time point, the method comprising:

providing a graphical user interface (GUI) screen of a robotic simulation platform for viewing a three-dimensional (3D) graphical representation of a simulated industrial scene wherein multiple robots perform robotic operations in respective robotic spaces;

receiving, for each robot of a plurality of robots, a set of crucial robotic locations within its own robotic space;

associating with each set of crucial robotic locations a set of corresponding crucial robotic time points collected during a simulation of the industrial scene executed by the robotic simulation platform;

representing each set of crucial robotic locations via a 3D graphic object that is positionable in the corresponding robotic space on the GUI screen, the object being a robotic slider configured to receive a user selection of a crucial robotic location;

enabling receiving a selection of a crucial robotic location of a specific robot via an interaction with a corresponding robotic slider; and upon receiving a selected crucial robotic location, enabling jumping the 3D graphical representation of the simulated scene to the crucial robotic time point associated with the selected crucial robotic location.

2. The method according to claim 1, wherein the set of crucial robotic locations are at least one of a robot's tool path, a set of a robot's target locations, a set of collision points and/or robot's swept volumes.

3. The method according to claim 1, which further comprises:

performing an inspection of the simulated scene at one or more crucial virtual time intervals around one or more crucial robotic time points;

modifying a set of robotic parameters based on an outcome of the inspection of the simulated scene;

re-executing the simulation with the modified robotic parameters;

inspecting the modified industrial simulated scene at one or more crucial virtual time intervals around one or more crucial robotic times; and enabling performing manufacturing operations based on the operations as simulated in the modified industrial simulated scene.

4. The method according to claim 1, wherein one or more robotic sliders comprise a moving and movable cursor for enabling simultaneously representing and interacting with a current virtual simulation time point on the one or more sliders for simulation inspection purposes.

5. The method according to claim 3, which comprises, after an execution of a simulation run, providing a selection of automatically detected critical robotic time points for simulation inspection purposes as a selection of corresponding critical robotic locations marked on one or more corresponding robotic sliders.

6. A data processing system for a robotic simulation platform configured to simulate an industrial scene with plurality of robots, the data processing system comprising:

a processor; and an accessible memory, the data processing system being configured to:

receive for each robot of a plurality of robots, a set of crucial robotic locations within its own robotic space;

associate with each set of crucial robotic locations a set of corresponding crucial robotic time points collected during a simulation of the industrial scene executed by the robotic simulation platform;

represent each crucial robotic location set via a three-dimensional (3D) graphic object positionable in the corresponding robotic space on a graphical user interface (GUI) screen, the graphic object being referred to as a robotic slider and the robotic slider being configured to receive a user selection of a crucial robotic location;

enable receiving a selection of a crucial robotic location of a specific robot via an interaction with a corresponding robotic slider; and upon receiving a selected crucial robotic location, enable jumping the 3D graphical representation of the simulated scene to the crucial robotic time point associated with the selected crucial robotic location.

7. The data processing system according to claim 6, wherein the set of crucial robotic locations comprises at least one of a robot's tool path, a set of a robot's target locations, a set of collision points, or a robot's swept volumes.

8. The data processing system according to claim 6 which is further configured to:

enable performance of an inspection of the simulated scene at one or more crucial virtual time intervals around one or more crucial robotic time points;

enable modification of a set of robotic parameters based on an outcome of the inspection having been performed;

re-execute the simulation with the modified robotic parameters;

enable inspection of the modified industrial simulated scene at one or more crucial virtual time intervals around one or more crucial robotic times; and enable performing manufacturing operations based on operations as simulated in the modified industrial simulated scene.

9. The data processing system according to claim 6, wherein one or more robotic sliders comprise a moving and movable cursor for enabling simultaneously representing and interacting with a current virtual simulation time point on said sliders for simulation inspection purposes.

10. The data processing system according to claim 6, wherein, after a simulation run execution, the data processing system is configured to provide a selection of automatically detected critical robotic time points for simulation inspection purposes as a selection of corresponding critical robotic locations marked on one or more corresponding robotic sliders.

11. A non-transitory computer-readable medium encoded with executable instructions that, when executed, cause one or more data processing systems to:

receive, for each robot of a plurality of robots, a set of crucial robotic locations within its own robotic space;

associate with each set of crucial robotic locations, a set of corresponding crucial robotic time points collected during a simulation of the industrial scene executed by a robotic simulation platform;

represent each set of crucial robotic locations via a three-dimensional (3D) graphic object positionable in a corresponding robotic space on a graphical user interface (GUI) screen, the object being a robotic slider that is configured to receive a user selection of a crucial robotic location;

enable receiving a selection of a crucial robotic location of a specific robot via an interaction with a corresponding robotic slider; and upon receiving a selected crucial robotic location, enable jumping the 3D graphical representation of the simulated scene to a crucial robotic time point associated with the selected crucial robotic location.

12. The non-transitory computer-readable medium according to claim 11, wherein the set of crucial robotic locations comprises at least one of a robot's tool path, a set of a robot's target locations, a set of collision points, and/or a robot's swept volumes.

13. The non-transitory computer-readable medium according to claim 11, which comprises further executable instructions that, when executed, cause the one or more data processing systems to:

enable performance of an inspection of the simulated scene at one or more crucial virtual time intervals around one or more crucial robotic time points;

enable modification of a set of robotic parameters based on an outcome of the inspection of the simulated scene;

re-execute the simulation with the modified set of robotic parameters;

enable inspection of the modified industrial simulated scene at one or more crucial virtual time intervals around one or more crucial robotic times; and enable performing manufacturing operations based on the operations as simulated in the modified industrial simulated scene.

14. The non-transitory computer-readable medium according to claim 11, wherein one or more robotic sliders comprise a moving and movable cursor for enabling simultaneously representing and interacting with a current virtual simulation time point on the sliders for simulation inspection purposes.

15. The non-transitory computer-readable medium according to claim 11, wherein after a simulation run execution, the one or more data processing systems provide a selection of automatically detected critical robotic time points for simulation inspection purposes as a selection of corresponding critical robotic locations marked on one or more corresponding robotic sliders.

* * * * *